US008545323B2

(12) United States Patent
McVicar et al.

(10) Patent No.: US 8,545,323 B2
(45) Date of Patent: Oct. 1, 2013

(54) VIDEO GAME CONTROLLER WITH COMPACT AND EFFICIENT FORCE FEEDBACK MECHANISM

(75) Inventors: David Neil McVicar, El Dorado, CA (US); Vance Alan Prather, Tracy, CA (US); David Ernest Wegmuller, Palo Alto, CA (US)

(73) Assignee: Logitech Europe S.A., Morges (CH)

( * ) Notice: Subject to any disclaimer, the term of this patent is extended or adjusted under 35 U.S.C. 154(b) by 1706 days.

(21) Appl. No.: 11/768,244

(22) Filed: Jun. 26, 2007

(65) Prior Publication Data

US 2008/0004114 A1     Jan. 3, 2008

Related U.S. Application Data

(60) Provisional application No. 60/806,396, filed on Jun. 30, 2006.

(51) Int. Cl.
*A63F 13/02*     (2006.01)
*G09G 5/00*     (2006.01)

(52) U.S. Cl.
USPC ............................ 463/38; 345/161; 463/37

(58) Field of Classification Search
USPC .................. 345/156, 161, 184; 463/37–38; 273/148 B; 310/807; 361/807
See application file for complete search history.

(56) References Cited

U.S. PATENT DOCUMENTS

| | | | |
|---|---|---|---|
| 3,919,691 A | 11/1975 | Noll | 345/419 |
| 4,310,922 A | 1/1982 | Lichtenberger et al. | 370/306 |
| 4,398,889 A | 8/1983 | Lam et al. | 434/45 |
| 4,493,992 A | 1/1985 | Geller | 250/221 |
| 4,730,188 A | 3/1988 | Milheiser | 340/825 |
| 4,748,643 A | 5/1988 | Setoguchi et al. | 375/369 |
| 4,758,164 A | 7/1988 | de Vries | 434/45 |
| 4,823,634 A | 4/1989 | Culver | 74/471 XY |
| 4,868,549 A | 9/1989 | Affinito et al. | 345/164 |
| 4,894,826 A | 1/1990 | Aggers et al. | 340/825.69 |
| 4,896,554 A | 1/1990 | Culver | 74/471 XY |
| 4,949,119 A | 8/1990 | Moncrief et al. | 365/578 |

(Continued)

FOREIGN PATENT DOCUMENTS

NL     9002669     7/1992

OTHER PUBLICATIONS

Instech, Motor Speed Control Cards, Feb. 5, 2004, http://www.instechlabs.com/OEM/controlcards/.*
Repperger et al., U.S. Statutory Invention Registration No. H703, "Manual Control Apparatus With Electable Mechanical Impedance," published on Nov. 7, 1989.
E. Donges, "Via Automobile Driving Simulator for Anthropogenic Research", published as report No. FB-41, Jul. 1978, pp. 1-44 (plus English abstract).
"Hard Drivin'", game promotional flyer, Atari Games Corporation, 1989, 2 pages.
"Automotive Steering Control Loader", McFadden Systems, Inc., product brochure, Interservice/Industry Training Systems Conference, Nov. 29, 30, Dec. 1, 2, 1987, 2 pages.

(Continued)

*Primary Examiner* — Dmitry Suhol
*Assistant Examiner* — Jason Yen
(74) *Attorney, Agent, or Firm* — Kilpatrick Townsend & Stockton LLP (57) ABSTRACT

A compact game controller incorporates an efficient and compact force feedback mechanism. Forces are generated at one of the controls of the controller in reaction to an action in a video game. The type of controller that can be held with two hands is limited in terms of size and internal space and in wireless versions is limited in terms of battery power. Efficient power consumption in the controller enables considerable usage time between battery replacement or recharging in wireless versions. The force feedback mechanism incorporates a double reduction gear system with a unique geometry which enables usage of a compact and energy efficient motor. The efficient force feedback mechanism and assembly can therefore be packaged within a compact ergonomic controller.

14 Claims, 6 Drawing Sheets

(56) References Cited

U.S. PATENT DOCUMENTS

| | | | | |
|---|---|---|---|---|
| 5,043,723 | A | 8/1991 | Araki et al. | 340/825.69 |
| 5,044,956 | A | 9/1991 | Behensky et al. | 434/45 |
| 5,113,179 | A | 5/1992 | Scott-Jackson et al. | 345/161 |
| 5,197,003 | A | 3/1993 | Moncrief et al. | 364/410 |
| 5,220,260 | A | 6/1993 | Schuler | 318/561 |
| 5,264,768 | A * | 11/1993 | Gregory et al. | 318/561 |
| 5,589,828 | A * | 12/1996 | Armstrong | 341/20 |
| 5,589,854 | A | 12/1996 | Tsai | 345/161 |
| 5,643,087 | A * | 7/1997 | Marcus et al. | 463/38 |
| 5,691,898 | A | 11/1997 | Rosenberg et al. | 364/190 |
| 5,721,566 | A | 2/1998 | Rosenberg et al. | 345/161 |
| 5,739,811 | A | 4/1998 | Rosenberg et al. | 345/161 |
| 5,754,023 | A | 5/1998 | Roston et al. | 318/561 |
| 5,781,172 | A | 7/1998 | Engel et al. | 345/164 |
| 5,831,408 | A | 11/1998 | Jacobus et al. | 318/568.11 |
| 5,877,702 | A | 3/1999 | Köhler | 340/825.72 |
| 5,907,487 | A | 5/1999 | Rosenberg et al. | 700/85 |
| 5,929,607 | A | 7/1999 | Rosenberg et al. | 320/166 |
| 5,929,846 | A | 7/1999 | Rosenberg et al. | 345/161 |
| 5,999,168 | A | 12/1999 | Rosenberg et al. | 345/161 |
| 6,020,875 | A | 2/2000 | Moore et al. | 345/156 |
| 6,067,077 | A | 5/2000 | Martin et al. | 345/161 |
| 6,104,158 | A | 8/2000 | Jacobus et al. | 318/568.11 |
| 6,104,382 | A * | 8/2000 | Martin et al. | 345/161 |
| 6,153,843 | A * | 11/2000 | Date et al. | 200/339 |
| 6,201,533 | B1 * | 3/2001 | Rosenberg et al. | 345/156 |
| 6,271,828 | B1 | 8/2001 | Rosenberg et al. | 345/156 |
| RE37,374 | E | 9/2001 | Roston et al. | 318/561 |
| 6,283,859 | B1 | 9/2001 | Carlson et al. | 463/36 |
| 6,292,713 | B1 | 9/2001 | Jouppi et al. | 700/245 |
| 6,300,936 | B1 | 10/2001 | Braun et al. | 345/156 |
| 6,300,937 | B1 | 10/2001 | Rosenberg | 345/156 |
| 6,320,284 | B1 | 11/2001 | Fontana et al. | 310/12 |
| 6,348,911 | B1 | 2/2002 | Rosenberg et al. | 345/156 |
| 6,380,925 | B1 | 4/2002 | Martin et al. | 345/161 |
| 6,429,849 | B1 * | 8/2002 | An et al. | 345/161 |
| 6,437,771 | B1 | 8/2002 | Rosenberg et al. | 345/156 |
| 6,512,509 | B1 | 1/2003 | McVicar | 345/161 |
| 6,536,298 | B1 | 3/2003 | Bellur et al. | 74/469 |
| 6,573,885 | B1 * | 6/2003 | McVicar | 345/161 |
| RE38,242 | E | 9/2003 | Engel et al. | 345/164 |
| 6,613,000 | B1 | 9/2003 | Reinkensmeyer et al. | 600/587 |
| 6,639,581 | B1 | 10/2003 | Moore et al. | 345/156 |
| 6,646,632 | B2 | 11/2003 | Wegmuller et al. | 345/163 |
| 6,704,001 | B1 | 3/2004 | Schena et al. | 345/161 |
| 6,710,764 | B1 | 3/2004 | Burgel et al. | 345/156 |
| 6,756,967 | B2 | 6/2004 | Onodera et al. | 345/161 |
| 6,801,008 | B1 | 10/2004 | Jacobus et al. | 318/568.11 |
| 7,038,667 | B1 * | 5/2006 | Vassallo et al. | 345/184 |
| 7,327,348 | B2 * | 2/2008 | Goldenberg et al. | 345/156 |
| 2003/0195042 | A1 * | 10/2003 | Murzanski et al. | 463/37 |
| 2005/0269769 | A1 * | 12/2005 | Naghi et al. | 273/148 B |
| 2007/0253178 | A1 * | 11/2007 | Uchiumi et al. | 361/807 |
| 2007/0278871 | A1 * | 12/2007 | Uchiumi et al. | 310/71 |

OTHER PUBLICATIONS

Logitech® MOMO® Racing, product listing, http://www.logitech.com/index.cfm/products/details/US/EN,CRID=2217,CONTENTID=6030, downloaded Sep. 23, 2005, 2 pages.

Logitech® Formula™ Force GP, product listing, http://www.logitech.com/index.cfm/products/details/US/EN,CRID=2217,CONTENTID=5026, downloaded Sep. 23, 2005, 2 pages.

Logitech® NASCAR® Racing Wheel, product listing, http://www.logitech.com/index.cfm/products/details/US/EN,CRID=2217,CONTENTID=9489, downloaded Sep. 23, 2005, 4 pages.

Logitech® Force™ 3D Pro, product listing, http://www.logitech.com/index.cfm/products/details/US/EN,CRID=2221,CONTENTID=10714, downloaded Sep. 23, 2005, 3 pages.

Logitech® Force™ 3D, product listing, http://www.logitech.com/index.cfin/products/details/US/EN,CRID=2221,CONTENTID=5016, downloaded Sep. 23, 2005, 2 pages.

Logitech® Precision™ Controller for Xbox®, product listing, http://www.logitec.com/index.cfm/products/details/US/EN,CRID= . . . , downloaded Oct. 5, 2005, 3 pages.

Margaret Minsky et al., "Feeling and Seeing: Issues in Force Display", Proceedings 1990 Symposium on Interactive 3D Graphics, Snowbird, Utah, Mar. 25-28, 1990, 11 pages.

Logitech, "Wingman Formula Force", product brochure, 1998, 2 pages.

Logitech, "Tiger Wingman Formula Force Wheel Hardware Specifications," SPEC-HW, ENG SPEC, TIGER, HWS-761782-0000, Rev. A, Mar. 9, 1999, 28 pages.

Gravis Destroyer Tilt Review, Hardware Review, http://www.sharkygames.com/hardware/reviews/controller/gravis_destoyer_tilt/2.shtml, downloaded Mar. 9, 2006, 2 pages.

Legion Hardware, Eliminator AfterShock Review, http://www.legionhardware.com/document.php?id=32&p=1, Dec. 20, 2001, 3 pages.

Gravis Exterminator Controller Picture, http://images.amazon.com/images/P/B00004R8U2.01.LZZZZZZZ.jpg, downloaded Mar. 9, 2006, 1 page.

* cited by examiner

VIDEO GAME CONTROLLER WITH COMPACT AND EFFICIENT FORCE FEEDBACK MECHANISM

CROSS-REFERENCE TO RELATED APPLICATION

This application claims the benefit of U.S. Provisional Patent Application No. 60/806,396 filed Jun. 30, 2006 entitled "VIDEO GAME CONTROLLER WITH COMPACT AND EFFICIENT FORCE FEEDBACK MECHANISM" to David Neil McVicar et al. This application is incorporated in its entirety by reference as if fully set forth herein.

FIELD OF THE INVENTION

The present application is generally related to pointing devices, and specifically to a game controller that incorporates a mini joystick with force feedback.

BACKGROUND OF THE INVENTION

Many pointing devices incorporate a force feedback feature. Such devices are commonly used in an interactive system which typically displays a visual environment to a user on a display screen. The user can interact with the displayed environment to play a game through the use of a user manipulable object or user interface device, such as a joystick, joypad button controller, mouse, trackball, stylus and tablet, or the like. The interface device is connected to the computer system controlling the displayed environment. The computer updates the simulation or game in response to the user's manipulation of the user manipulable object, and provides feedback to the user.

Typically, motors or other actuators are coupled to the user manipulable object and are controlled by the computer system. Position sensors monitor the position of the user manipulable object and provide the measurement data to the computer system, which processes the data. Based on the data, the computer system generates control signals for controlling the motors to produce feedback forces to the user manipulable object, thereby conveying physical sensations in addition to visual stimulation to the user.

There are many challenges to incorporating force feedback into a small handheld game controller such as the type currently used with the various versions of the Sony PlayStation®, Microsoft Xbox® or the like. Among the greatest challenges are size, power, and weight constraints. Corded USB controllers are limited to the power supplied via the USB connection, which is about 500 milliamps. Cordless controllers rely on battery power and many force feedback systems consume a relatively large amount of power that would consume the battery life in relatively short time frame.

SUMMARY OF INVENTION

A compact game controller incorporates an efficient and compact force feedback mechanism. Forces are generated at one of the controls of the controller in reaction to an action in a video game. The type of controller that can be held with two hands is limited in terms of size and internal space and in wireless versions is limited in terms of battery power. Efficient power consumption in the controller enables considerable usage time between battery replacement or recharging in wireless versions. The force feedback mechanism incorporates a double reduction gear system with a unique geometry which enables usage of a compact and energy efficient motor. The efficient force feedback mechanism and assembly can therefore be packaged within a compact ergonomic controller.

One aspect of the present invention involves a method of providing force feedback in a game controller. The method comprises providing a motor assembly and a pinion gear on the shaft of the motor. The motor is located in a portion of the controller that is held within a hand during controller usage. The method also comprises converting the rotating force at the first pinion gear of the motor assembly into a feedback force produced as a function of a game. The feedback force is exerted upon a position manipulation device controlled by a thumb of the hand in which the portion of the controller is held.

Another aspect of the present invention relates to a game controller that comprises a body with a first and a second lobe, wherein a user of the controller may grip the first lobe with a first hand and the second lobe with a second hand. The controller also comprises a printed circuit board within the body that includes circuitry that operates the controller. A first set of controls accessible to the first hand and a second set of controls is accessible to the second hand. One of the first or second set of controls includes a force feedback mechanism that comprises a user manipulable object located on a first side of the printed circuit board and an actuator located on a second side of the printed circuit board. The actuator drives the user manipulable object in rotation around an axis. A gear system is coupled between the actuator and the user manipulable object and provides a gear reduction from the actuator to the user manipulable object. The gear system includes at least one annular gear which includes teeth on a concave side engaging teeth of a pinion for driving the annular gear. The gear system comprises a double reduction gear system.

DETAILED DESCRIPTION OF THE PREFERRED EMBODIMENTS

The current game controllers used with the various versions of the Sony PlayStation®, Microsoft Xbox® or other game systems have multiple sets of controls in one small form factor. These controllers are held with two hands and there are typically two different independent systems to control the action for each hand. In one example controller, there is a directional pad and a joystick available for the left hand, and a joystick and joypad (group of buttons) available for the right hand. A user may choose to play with whatever combination of controls he chooses. In addition, the controller is ergonomically shaped so that each hand can wrap around the controller and so that triggers can be pulled with the index finger of each hand. This requires a lobe for the palm of each hand to wrap around and grip. In wireless versions batteries must also be accommodated. Thus, there are space constraints not otherwise present in a stand alone joystick.

In many games, force feedback adds a new dimension to the experience. In particular, driving or other simulation type games that mimic situations with real world gravitational forces that a user is familiar with will enhance the user experience. For instance, gravitational forces acting on a vehicle as it corners or changes velocity can be simulated with the controller by providing resistance to the user's input at the controller. In the case of a joystick, the force feedback can make the joystick easier or more difficult to move in a particular direction based upon the action taking place in the game.

Figure 1A:
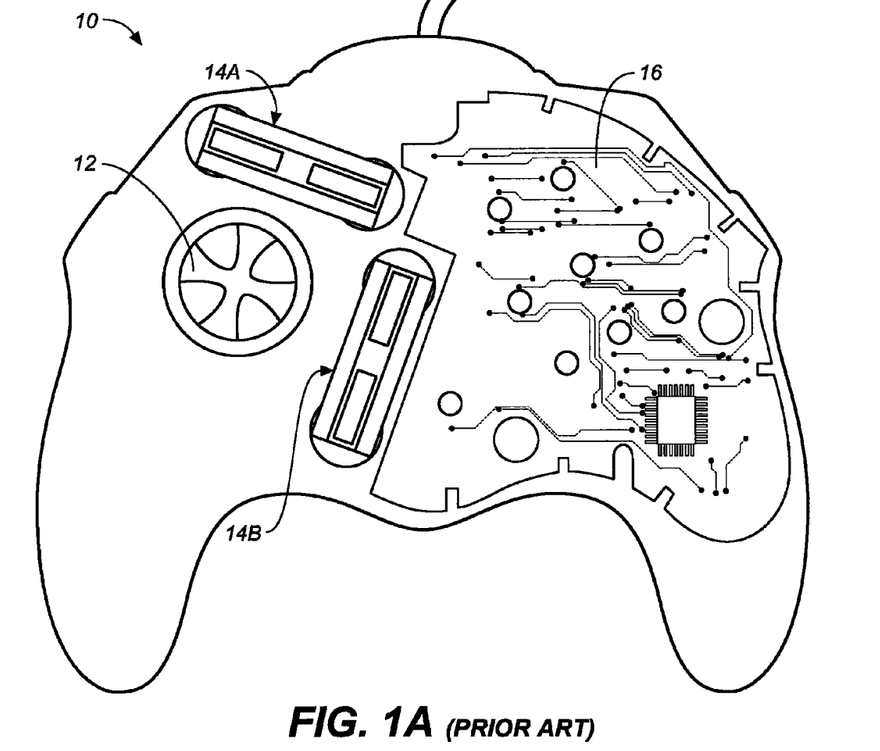
FIG. 1A is a top view of a prior art controller 10 with the top removed.

FIG. 1A shows a prior game controller 10 that provides force feedback to directional pad 12 with a pair of electromagnetic drives 14A and 14B. As can be seen in the figure, the directional pad 12 and the associated electromagnetic drives 14 take up a very large portion of the overall controller 10. As a rough approximation, directional pad 12 and the associated electromagnetic drives 14 occupy the left half of the controller while circuit board 16 occupies the right half of the controller. Above the circuit board, on the right side, are a group of game control buttons (not shown). Triggers (not shown) are also present on the underside of the controller. Thus, not including the triggers, controller 10 has two sets of game controls: the directional pad 12 on the left; and the joypad buttons on the right.

Figure 1B:
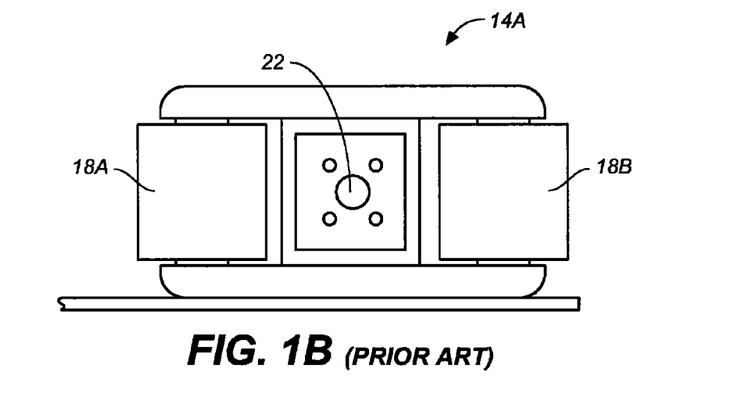
FIG. 1B is an elevation of electromagnetic drive 14A of prior art controller 10 shown in FIG. 1A.

Each electromagnetic drive 14(A or B) has two electromagnetic coils 18. As can be seen in FIG. 1B, coil 18A is on the left and coil 18B is on the right. Between the coils is a member that is driven based on the field generated by the coils. The member is coupled to the directional pad 12 and the force produced at the member by the coils is transmitted to pad 12. Position sensor 22 detects the position of the member. The controller 10 utilizes a direct coupled electromagnetic drive to provide force feedback to the directional pad. By direct coupled, it is meant that the force produced at the member is coupled to the directional pad without usage of a gear system. While this electromagnetic drive produces relatively fluid feedback free from cogging problems that may be present in a direct drive motor or even a single reduction motor, the electromagnetic drives are large, heavy, and very power hungry. Each axis is controlled by a drive, and each drive requires about 300 mA at 4V. This power requirement renders it impractical for wireless solutions that must depend upon battery power of the controller. The batteries would be consumed in an unacceptably short time with such a system. In fact, with only 500 mA available from a USB connection, this solution is problematic even in a corded controller. In a dual axis force feedback system the 600 mA of current exceeds the 500 mA maximum of the USB standard. Furthermore, the electromagnetic drives are significantly more expensive than the solution provided by the present invention, which will be described with reference to FIGS. 2-8.

Figure 2:
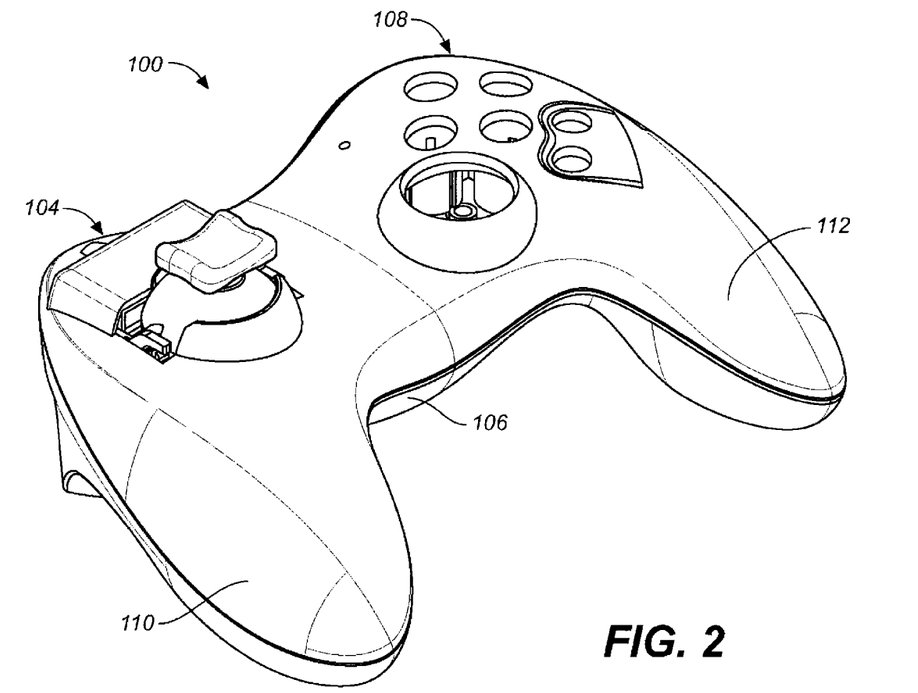
FIG. 2 is a perspective view of controller 100, an embodiment of the present invention.

FIG. 2 illustrates game controller 100, an embodiment of the present invention. Controller 100 comprises a body 106. Both controller 100 and body 106 are meant to be held with two hands when playing a game and comprise a left lobe 10 and right lobe 112. A player grips each of the lobes and then can manipulate the left set of controls 104 and the right set of controls,108 with a thumb of each hand, and can pull a trigger 130 (not shown) with another finger such as an index finger. Each set of controls includes two or more different types of controls. The various types include the aforementioned directional pad, game control buttons also referred to as a joypad, and a thumb cap/joystick.

Figure 3:
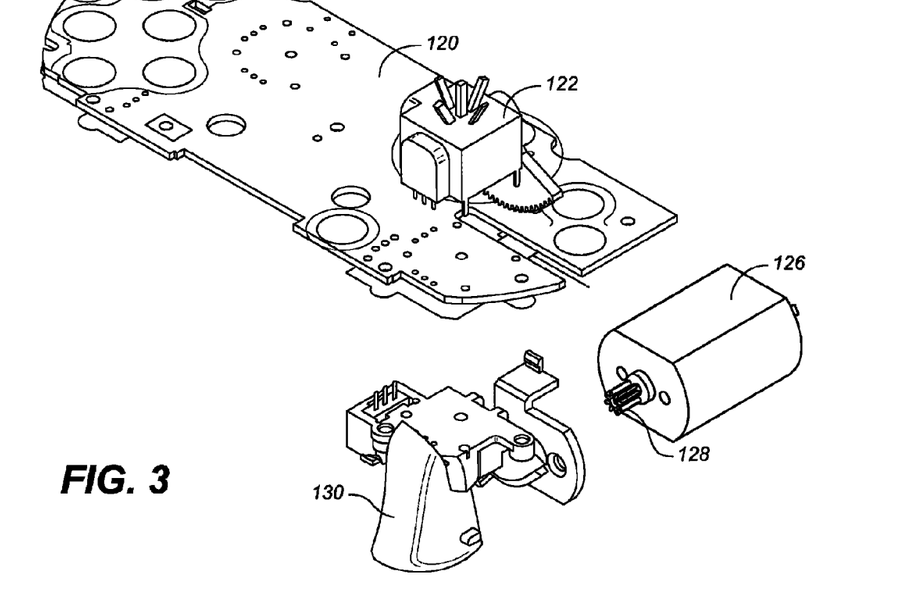
FIG. 3 is perspective view of some components of controller 100.

FIG. 3 illustrates a main printed circuit board 120 of the controller. Mounted on a first side, which can be referred to as the top side as it is adjacent the top of the controller, is a mini joystick 122. In some preferred embodiments, motor 126 is mounted on the opposite side of the main circuit board 120. On a shaft of motor 126 is a pinion 128. One trigger 130 is also shown.

Figure 4:
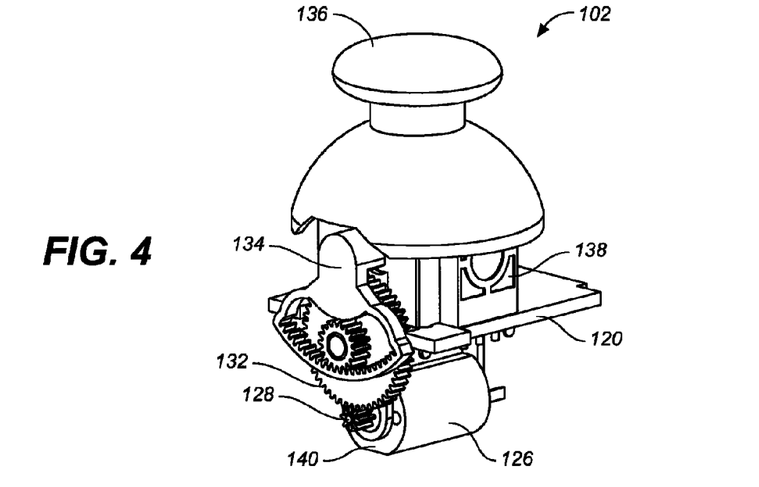
FIG. 4 is a perspective view of assembly 102 that incorporates a force feedback mechanism.
Figure 5:
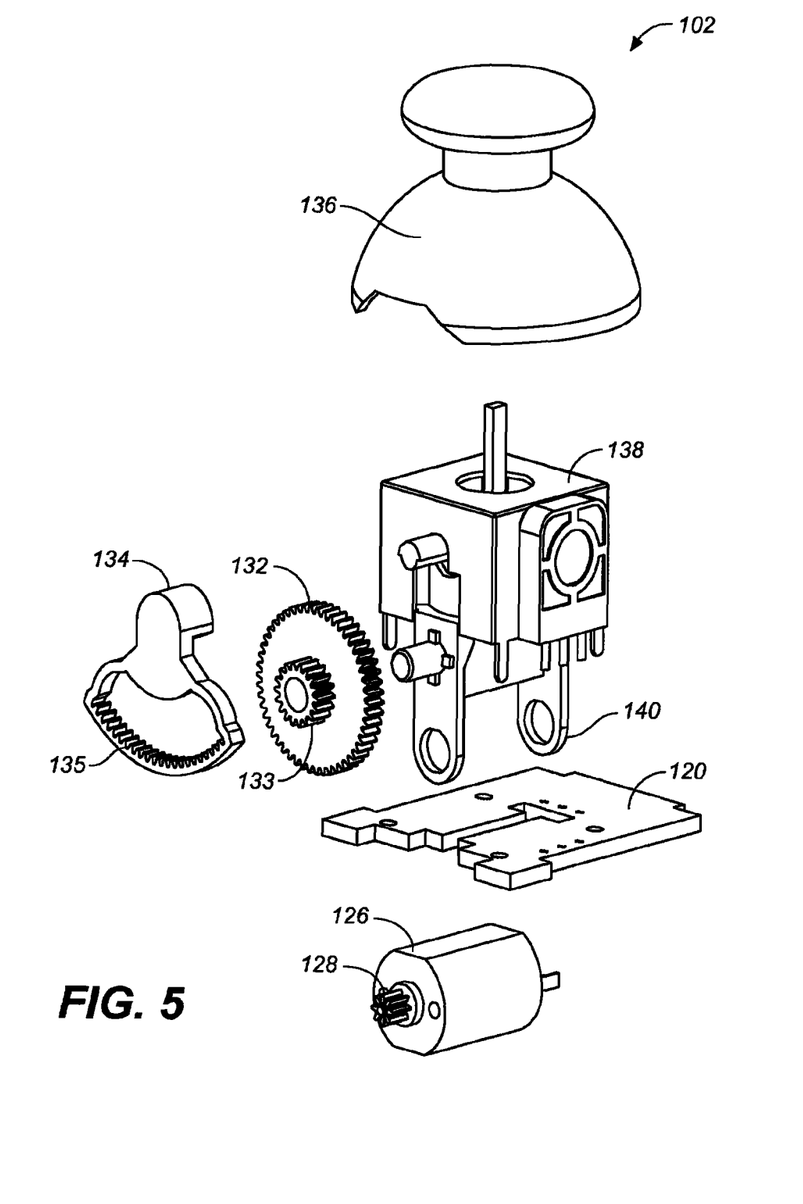
FIG. 5 is an exploded view of assembly 102.

FIG. 4 is a perspective view, and FIG. 5 is an exploded view of assembly 102 of controller 100. Assembly 102 comprises a printed circuit board, which may be the main printed circuit board 120 or any other separate or additional printed circuit board. It also comprises motor 126, pinion 128, double reduction gear 132, which itself comprises an intermediate pinion 133, annular sector gear 134, mini joystick thumb cap 136, and joystick gimbal/potentiometer mechanism 138. As best seen in FIG. 5, sub frame 140 has a shaft about which double reduction gear 132 rotates. Sub frame 140 also has a shaft about which annular sector gear 134 pivots. The sub frame extends through the circuit board from the top side of the circuit board to the bottom side, where the motor 126 mounts to the sub frame. In the particular embodiment illustrated, a cylindrical protrusion surrounding the output shaft fits within a circular hole of the sub frame. This assembly allows the motor to be placed where it can best be accommodated, on the underside of the main circuit board. As mentioned previously, the circuit board need not necessarily be the main circuit board but may be an auxiliary circuit board. In some embodiments, the motor extends into the lobes of the controller. In certain embodiments where a relatively large amount of torque and motor are required in comparison to the body size the body of controller 100, the body may include a slight protrusion at the underside to accommodate the motor.

Torque produced by the gear system is multiplied by the combination of the various gears. This enables usage of a relatively small motor in order to produce a desired torque upon thumb cap 136. Given that wireless embodiments of controller 100 with long battery life and play time are important, a smaller and more efficient motor is desirable. Furthermore, the smaller motor, and compact geometry of assembly 102 in general, allow for a smaller overall controller. As mentioned in the background, prior art controller 10 is rather large and heavy. This is likely a result of the rather large electromagnetic drive system. Furthermore, on a per axis basis, at 4 volts the prior art force feedback system draws 300 milliamps, whereas at the same voltage the force feedback system of assembly 102 draws only 50 milliamps. Thus the force feedback system of the present invention consumes about one sixth the power of the prior system: about 0.2 watts vs. 1.2 watts. In embodiments where the force feedback is provided on both the left-right and the front-back axes, this consumption difference is even more important. This is not only the case for wireless embodiments, but also for embodiments drawing power from a USB connection, which is specified to provide a maximum of 2.5 watts.

The ratio of the various gears in combination with the annular sector gear allows for a very compact assembly. Both the compact gear system and the compact motor make possible a smaller and lighter controller. This is an important advantage in a very competitive market where bulky controllers are not commercially successful.

One problem that is present in a direct coupled solution and to a lesser extent in single reduction gearing systems is known as "cogging." The cogging occurs because the action of the motor produces a somewhat jerky or coarse feeling as the motor turns, which is transmitted to the user and makes the force feedback and the overall controller feel jerky or otherwise poorly actuated. This is, of course, undesirable in a game controller, and the double reduction gear system of the preferred embodiments reduces this to an un-noticeable level in addition to providing a compact and efficient solution for providing force feedback within a game controller.

For further information on the operation and geometry of a double reduction gear system, please refer to U.S. Pat. No. 6,573,885 to McVicar, which is hereby incorporated by reference in its entirety.

Figure 6:
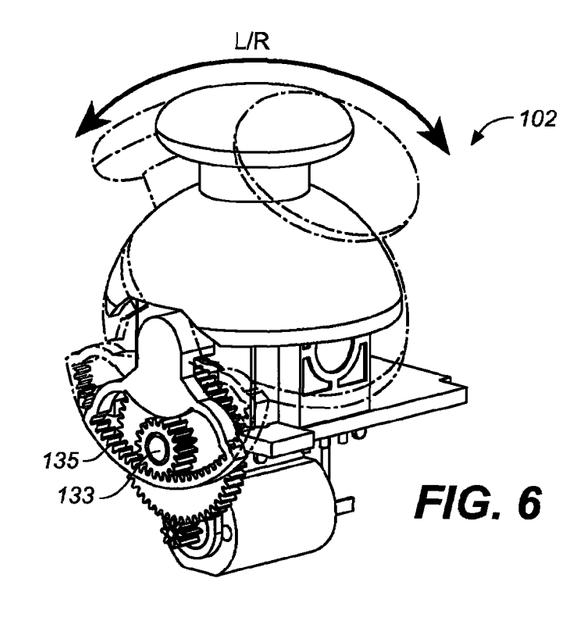
FIG. 6 is a perspective view of thumb cap 136 in 3 positions as it is rotated about a left-right axis.

FIG. 6 illustrates the movement of assembly 102 along the left-right axis. Intermediate pinion 133 meshes with the teeth on the concave portion 135 of annular sector gear 134. As the annular sector gear 134 and thumb cap 136 pivots, concave portion 135 travels from one end of the sector to another. A full size gear of the same diameter and/or ratio would be significantly larger and impractical for inclusion in a small controller.

Figure 7:
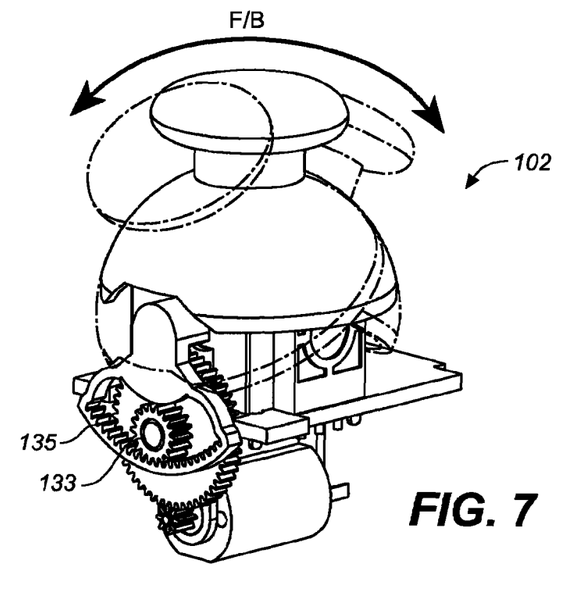
FIG. 7 is a perspective view of thumb cap 136 in 3 positions as it is rotated about a front-back axis.

FIG. 7 illustrates the movement of assembly 102 along the front-back axis. As no feedback is provided along this axis the gear system is stationary. Although single axis feedback has been illustrated in the pictured embodiments, other embodiments may include dual axis feedback.

Figure 8:
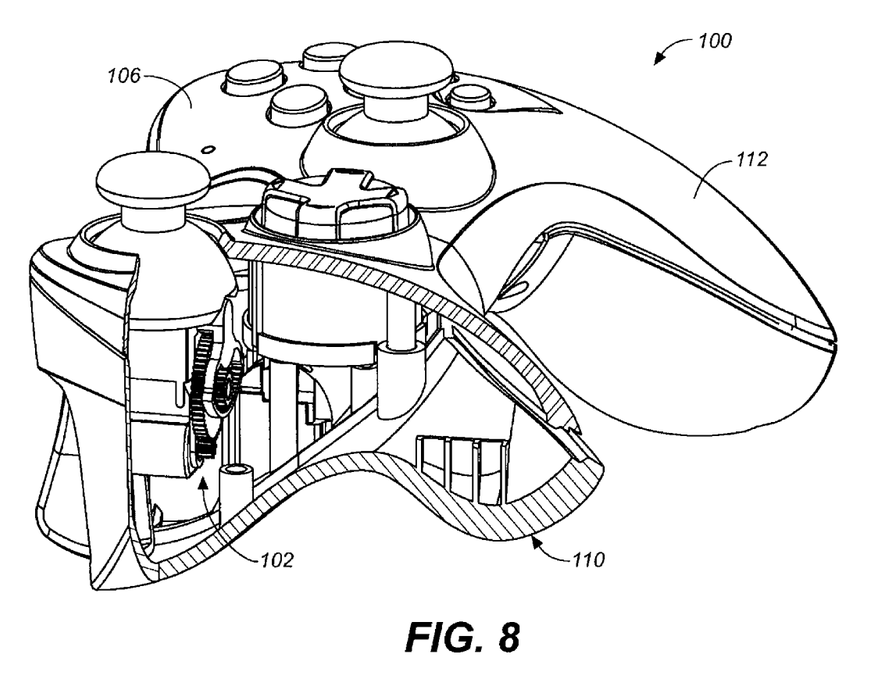
FIG. 8 is a cut away view illustrating assembly 102 within the body of controller 100.

FIG. 8 is a cut-away view of controller 100. Assembly 102 is shown actuating one of the controls of the left lobe 110 of the controller. This feedback may, however, be provided at the left or right side controls. Although in the embodiment shown the motor is directly under the gimbal/potentiometer mechanism 138, in other embodiments it extends outside of the footprint towards or into the lobes.

Although the various aspects of the present invention have been described with respect to exemplary embodiments thereof, it will be understood that the present invention is entitled to protection within the full scope of the appended claims.

What is claimed is:

1. A game controller comprising:
a body comprising a first and a second lobe, wherein a user of the controller may grip the first lobe with a first hand and the second lobe with a second hand;
a first set of controls accessible to the first hand; and
a second set of controls accessible to the second hand,
wherein one of the first or second set of controls includes a compact force feedback mechanism disposed within the body and comprising:
a printed circuit board having a first side and a second side;
a user manipulable object mounted on the first side of the printed circuit board;
an actuator, mounted on the second side of the printed circuit board, the actuator for driving the user manipulable object in rotation around an axis; and
a gear system mounted on the user manipulable object and positioned adjacent and perpendicular to the printed circuit board, the gear system configured to couple the actuator to the user manipulable object, wherein the gear system provides a gear reduction from the actuator to the user manipulable object, wherein the gear system includes at least one annular gear which includes teeth on a concave side engaging teeth of a pinion for driving the annular gear, and wherein the gear system comprises a double reduction gear system.

2. The game controller of claim 1, further comprising a power source within the body, and wherein the circuitry of the printed circuit board comprises wireless communication circuitry.

3. The game controller of claim 2, wherein the double reduction gear system multiplies the torque of the actuator.

4. The game controller of claim 1 wherein the gear system comprises:
a drive pinion connected to the actuator to be driven by the actuator in rotation;
a gear coupled to the drive pinion to be driven by the drive pinion; and
an intermediate pinion connected to the gear to move with the gear.

5. The game controller of claim 4, wherein the intermediate pinion connected to the gear engages with the teeth on the concave side of the annular gear.

6. The game controller of claim 1, wherein the user manipulable object comprises a thumb cap for manipulation by a thumb of the first or second hand.

7. The game controller of claim 6, wherein the first set of controls comprises the force feedback mechanism, including the thumb cap, and a directional pad also for use by the first hand.

8. The game controller of claim 1, wherein the actuator extends into one of the first or second lobes.

9. The game controller of claim 8, wherein the body comprises a protrusion at or near the lobe that the actuator extends into.

10. The game controller of claim 1, wherein the actuator produces force feedback along only one axis of the user manipulable object, and wherein the actuator consumes about 0.2 watts in producing the force.

11. An assembly comprising:
a housing including a first and a second lobe, wherein the first lobe can be gripped with a first hand and the second lobe can be gripped with a second hand;
a set of controls disposed in the housing and accessible to the first hand, wherein the set of controls includes a compact force feedback mechanism including:
a printed circuit board having a first side and a second side and comprising circuitry for manipulating game play in coordination with a gaming system;
a user manipulable object mounted on a first side of the printed circuit board;
an actuator, mounted on a second side of the printed circuit board, the actuator for driving the user manipulable object in rotation around an axis; and
a gear system mounted on the user manipulable object and positioned adjacent and perpendicular to the printed circuit board, wherein the gear system is configured to couple the actuator to the user manipulable object, wherein the gear system extends from an area on the first side of the printed circuit board to the second side of the printed circuit board, wherein the gear system provides a gear reduction from the actuator to the user manipulable object, and wherein the gear system includes at least one annular gear portion which includes teeth on a concave side engaging teeth of a pinion for driving the annular gear portion, wherein the gear system comprises a double reduction gear system.

12. The assembly of claim 11, wherein the actuator is comprised of a rotating motor.

13. The assembly of claim 12, wherein the actuator produces force feedback along only one axis of the user manipulable object, and wherein the actuator consumes less than about 0.3 watts in producing the feedback.

14. The assembly of claim 11 wherein the gear system comprises:
- a drive pinion connected to the actuator to be driven by the actuator in rotation;
- a gear coupled to the drive pinion to be driven by the drive pinion; and
- an intermediate pinion connected to the gear to move with the gear.

* * * * *